(12) United States Patent
Vejlgaard et al.

(10) Patent No.: US 12,535,554 B2
(45) Date of Patent: Jan. 27, 2026

(54) USER EQUIPMENT POSITIONING

(71) Applicant: Nokia Technologies Oy, Espoo (FI)

(72) Inventors: Benny Vejlgaard, Gistrup (DK);
Mikko Säily, Laukkoski (FI)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 18/246,827

(22) PCT Filed: Oct. 9, 2020

(86) PCT No.: PCT/EP2020/078416
§ 371 (c)(1),
(2) Date: Mar. 27, 2023

(87) PCT Pub. No.: WO2022/073619
PCT Pub. Date: Apr. 14, 2022

(65) Prior Publication Data
US 2023/0366974 A1    Nov. 16, 2023

(51) Int. Cl.
*G01S 5/02* (2010.01)
*H04W 64/00* (2009.01)

(52) U.S. Cl.
CPC ......... *G01S 5/0284* (2013.01); *G01S 5/0268* (2013.01); *H04W 64/003* (2013.01)

(58) Field of Classification Search
CPC ... G01S 5/0284; G01S 5/0268; H04W 64/003
See application file for complete search history.

(56) References Cited

U.S. PATENT DOCUMENTS

2016/0095092 A1    3/2016    Khoryaev et al.
2018/0115937 A1    4/2018    Poitau et al.
(Continued)

FOREIGN PATENT DOCUMENTS

| WO | 2016/048509 A1 | 3/2016 |
| WO | 2019/158223 A1 | 8/2019 |
| WO | 2020/064120 A1 | 4/2020 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.0.0, Mar. 2020, pp. 1-107.

(Continued)

*Primary Examiner* — Curtis B Odom
(74) *Attorney, Agent, or Firm* — Barta Jones, PLLC

(57) ABSTRACT

The present disclosure relates to User Equipment positioning apparatuses, methods and computer programs. Certain examples provide a User Equipment, UE (110), comprising means (500) for: receiving (201), from a Radio Access Network, RAN, node (120), positioning configuration information (801, 801') for configuring the UE to perform a device-to-device communication channel based positioning procedure (803, 803') with one or more other UEs (110*a*, 110*b*) for enabling the UE to determine information (804) indicative of one or more positions of the one or more other UEs relative to the UE; performing (202), based at least in part on the configuration information, the device-to-device communication channel based positioning procedure and determining therefrom information indicative of the one or more positions of the one or more other UEs relative to the UE; and transmitting (203), to the RAN node, the information indicative of the one or more positions of the one or more other UEs relative to the UE.

4 Claims, 5 Drawing Sheets

(56) References Cited

U.S. PATENT DOCUMENTS

2019/0230618 A1 7/2019 Saur et al.
2020/0178036 A1* 6/2020 Edge .................. G01S 5/0236

OTHER PUBLICATIONS

"3rd Generation Partnership Project; Technical Specification Group Radio Access Network; Study on local NR positioning in NG-RAN (Release 16)", 3GPP TR 38.856, V16.0.0, Dec. 2019, pp. 1-18.

"New SID: Study on use cases, scenarios, and requirements of sidelink positioning", 3GPP TSG RAN Meeting #88e, RP-200859, Agenda: 9.1, LG Electronics, Jun. 29-Jul. 3, 2020, 4 pages.

"New SID on support of reduced capability NR devices", 3GPP TSG RAN Meeting #86, RP-193238, Agenda: 9.1.1, Ericsson, Dec. 9-12, 2019, 5 pages.

"How Accurate is TDOA Geolocation?", CRFS, Retrieved on Apr. 24, 2023, Webpage available at : https://pages.crfs.com/blog/how-accurate-tdoa-geolocation.

Chen et al., "High-resolution hybrid localization in passive wireless sensor nets", 25th Biennial Symposium on Communications, May 12-14, 2010, pp. 126-129.

"3rd Generation Partnership Project; Technical Specification Group Services and System Aspects; Service requirements for the 5G system; Stage 1 (Release 17)", 3GPP TS 22.261, V17.2.0, Mar. 2020, 83 pages.

Peral-Rosado et al., "Survey of Cellular Mobile Radio Localization Methods: From 1G to 5G", IEEE Communications Surveys & Tutorials, vol. 20, No. 2, Dec. 19, 2017, pp. 1124-1148.

Liu et al., "Survey of Wireless Indoor Positioning Techniques and Systems", IEEE Transactions on Systems, Man, and Cybernetics, Part C (Applications and Reviews), vol. 37, No. 6, Nov. 2007, pp. 1067-1080.

"3rd Generation Partnership Project; Technical Specification Group Radio Access Network; Evolved Universal Terrestrial Radio Access (E-UTRA); LTE physical layer; General description (Release 16)", 3GPP TS 36.201, V16.0.0, Jun. 2020, pp. 1-15.

International Search Report and Written Opinion received for corresponding Patent Cooperation Treaty Application No. PCT/EP2020/078416, dated Jun. 18, 2021, 18 pages.

Office Action received for corresponding Indian Patent Application No. 202347031072, dated Nov. 23, 2023, 7 pages.

Office action received for corresponding European Patent Application No. 20789938.6, dated Jun. 3, 2025, 5 pages.

\* cited by examiner

USER EQUIPMENT POSITIONING

RELATED APPLICATION

This application was originally filed as PCT Application No. PCT/EP2020/078416, filed on Oct. 9, 2020, which is incorporated herein by reference in its entirety.

TECHNOLOGICAL FIELD

Examples of the present disclosure relate to User Equipment positioning. Some examples, though without prejudice to the foregoing, relate to a User Equipment positioning process utilising a device-to-device communication channel.

BACKGROUND

The position of a User Equipment (UE) within a Radio Access Network (RAN) can be determined, i.e. by a Location Management Function (LMF), by various network-based positioning techniques involving the exchange, over a Uu interface, of positioning reference signals between a UE and RAN nodes. Such network-based positioning techniques may utilise one of the following methods: Downlink Time Difference of Arrival (DL-TDOA), Uplink Time Difference of Arrival (UL-TDOA), Downlink Angle of Departure (DL-AoD), Uplink Angle of Arrival (UL-AoA), Multi-cell Round Trip Time (Multi-RTT).

In order to provide accurate positioning for such downlink and uplink-based positioning techniques, typically a wideband positioning reference signal (e.g. 100 MHz or more dependent on the desired position accuracy) needs to be either received or transmitted. Accordingly, both downlink and uplink-based UE positioning require a wideband UE device. However, such wideband UE devices, and the use of wideband signals, gives rise to increased power consumption (and reduced battery life) as compared to UE devices having a reduced bandwidth operation, i.e. that are configured for and use low bandwidth signals. Moreover, wideband UE devices, receivers/transmitters/transceivers for the same, are more complex as well as more costly to manufacture than those only requiring operation at lower bandwidth. It can be desirable to provide an improved positioning technique, and a UE, RAN node and location server for use with the same. In some circumstances it may be desirable to provide a positioning technique that can be used with UE devices having a reduced bandwidth operation, and hence reduced power consumption as well as reduced use of radio-frequency spectrum resources and radio network infrastructure.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the independent claims.

Any examples/embodiments and features described in this specification that do not fall under the scope of the independent claims are to be interpreted as examples useful for understanding various embodiments of the invention.

According to at least some examples of the disclosure there is provided a User Equipment, UE, comprising means for:
  receiving, from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;
  performing, based at least in part on the configuration information, the device-to-device communication channel based positioning procedure and determining therefrom information indicative of the one or more positions of the one or more other UEs relative to the UE; and
  transmitting, to the RAN node, the information indicative of the one or more positions of the one or more other UEs relative to the UE.

According to various, but not necessarily all, examples of the disclosure there is provided a method comprising:
  receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;
  performing, by the UE based at least in part on the configuration information, the device-to-device communication channel based positioning procedure and determining therefrom information indicative of the one or more positions of the one or more other UEs relative to the UE; and
  transmitting, from the UE to the RAN node, the information indicative of the one or more positions of the one or more other UEs relative to the UE.

According to various, but not necessarily all, examples of the disclosure there is provided a chipset, a module or a device configured to perform the above method.

According to various, but not necessarily all, examples of the disclosure there is provided computer program instructions for causing an apparatus to perform:
  receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;
  performing, by the UE based at least in part on the configuration information, the device-to-device communication channel based positioning procedure and determining therefrom information indicative of the one or more positions of the one or more other UEs relative to the UE; and
  transmitting, from the UE to the RAN node, the information indicative of the one or more positions of the one or more other UEs relative to the UE.

According to various, but not necessarily all, examples of the disclosure there is provided at least one processor; and
  at least one memory including computer program instructions;
  the at least one memory and the computer program instructions configured to, with the at least one processor, cause the apparatus at least to perform:

receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;

performing, by the UE based at least in part on the configuration information, the device-to-device communication channel based positioning procedure and determining therefrom information indicative of the one or more positions of the one or more other UEs relative to the UE; and transmitting, from the UE to the RAN node, the information indicative of the one or more positions of the one or more other UEs relative to the UE.

According to various, but not necessarily all, examples of the disclosure there is provided a non-transitory computer readable medium encoded with instructions that, when performed by at least one processor, causes at least the following to be performed:

receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;

performing, by the UE based at least in part on the configuration information, the device-to-device communication channel based positioning procedure and determining therefrom information indicative of the one or more positions of the one or more other UEs relative to the UE; and transmitting, from the UE to the RAN node, the information indicative of the one or more positions of the one or more other UEs relative to the UE.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

According to at least some examples of the disclosure there is provided a Radio Access Network, RAN, node, comprising means for:

transmitting, to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;

receiving, from the first UE, information indicative of the one or more positions of the one or more other UEs relative to the first UE; and transmitting, to a location server, the information indicative of the one or more positions of the one or more other UEs relative to the first U E.

According to various, but not necessarily all, examples of the disclosure there is provided a method comprising:

transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;

receiving, at the RAN node from the first UE, information indicative of the one or more positions of the one or more other UEs relative to the first UE; and transmitting, from the RAN node to a location server, the information indicative of the one or more positions of the one or more other UEs relative to the first UE.

According to various, but not necessarily all, examples of the disclosure there is provided a chipset, a module or a device configured to perform the above method.

According to various, but not necessarily all, examples of the disclosure there is provided computer program instructions for causing an apparatus to perform:

transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;

receiving, at the RAN node from the first UE, information indicative of the one or more positions of the one or more other UEs relative to the first UE; and transmitting, from the RAN node to a location server, the information indicative of the one or more positions of the one or more other UEs relative to the first UE.

According to various, but not necessarily all, examples of the disclosure there is provided at least one processor; and at least one memory including computer program instructions;

the at least one memory and the computer program instructions configured to, with the at least one processor, cause the apparatus at least to perform:

transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;

receiving, at the RAN node from the first UE, information indicative of the one or more positions of the one or more other UEs relative to the first UE; and transmitting, from the RAN node to a location server, the information indicative of the one or more positions of the one or more other UEs relative to the first UE.

According to various, but not necessarily all, examples of the disclosure there is provided a non-transitory computer readable medium encoded with instructions that, when performed by at least one processor, causes at least the following to be performed:

transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;

receiving, at the RAN node from the first UE, information indicative of the one or more positions of the one or more other UEs relative to the first UE; and transmitting, from the RAN node to a location server, the information indicative of the one or more positions of the one or more other UEs relative to the first UE.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

According to at least some examples of the disclosure there is provided a location server comprising means for:

causing transmission, to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and receiving information indicative of the one or more positions of the one or more other UEs relative to the first UE.

According to various, but not necessarily all, examples of the disclosure there is provided a method comprising:

causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and receiving, at the location server, information indicative of the one or more positions of the one or more other UEs relative to the first UE.

According to various, but not necessarily all, examples of the disclosure there is provided a chipset, a module or a device configured to perform the above method.

According to various, but not necessarily all, examples of the disclosure there is provided computer program instructions for causing an apparatus to perform:

causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and receiving, at the location server, information indicative of the one or more positions of the one or more other UEs relative to the first UE.

According to various, but not necessarily all, examples of the disclosure there is provided at least one processor; and at least one memory including computer program instructions;

the at least one memory and the computer program instructions configured to, with the at least one processor, cause the apparatus at least to perform:

causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and receiving, at the location server, information indicative of the one or more positions of the one or more other UEs relative to the first UE.

According to various, but not necessarily all, examples of the disclosure there is provided a non-transitory computer readable medium encoded with instructions that, when performed by at least one processor, causes at least the following to be performed:

causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and receiving, at the location server, information indicative of the one or more positions of the one or more other UEs relative to the first UE.

According to various, but not necessarily all, examples of the disclosure there is provided a chipset comprising processing circuitry configured to perform the above-mentioned method. According to various, but not necessarily all, examples of the disclosure there is provided a module, device and/or system comprising means for performing the above-mentioned method.

The following portion of this 'Brief Summary' section describes various features that can be features of any of the examples described in the foregoing portion of the 'Brief Summary' section.

In some but not necessarily all examples, performing the device-to-device communication channel based positioning procedure may comprise the UE transmitting, to the one or more other UEs and based at least in part on the configuration information, second configuration information, wherein the second configuration information comprises:

information related to a first reference signal to be received from the UE;

information related to a second reference signal to be transmitted to the UE; and a request for time information.

In some but not necessarily all examples, performing the device-to-device communication channel based positioning procedure may comprise the UE transmitting, based at least in part on the configuration information, the first reference signal via either:

a UE-to-RAN communication channel, or the device-to-device communication channel.

In some but not necessarily all examples, a bandwidth of the first and/or second reference signals may be less than 5 MHz or less than 20 MHz.

In some but not necessarily all examples, the information indicative of positions of the one or more other UEs relative to the UE may comprise information indicative of a Round Trip Time (RTT) and/or Angle of Arrival (AOA).

In some but not necessarily all examples, the RAN node may comprise means for:

transmitting, to the first UE, further positioning configuration information for configuring the first UE to perform a RAN-to-device communication channel based positioning procedure for enabling a determination of information indicative of a position of the first UE;

receiving, from the first UE responsive to the further configuration information, a first reference signal;

reporting, to the location server, receipt of the first reference signal.

In some but not necessarily all examples, the RAN node may comprise means for:

receiving, responsive to the transmission of the information indicative of positions of one or more other UEs relative to the first UE, a selection from the location server of a second UE from the one of more other UEs; and transmitting, to the second UE, second positioning configuration information for configuring the second UE to perform a device-to-device communication channel based positioning procedure with the first UE and the remaining one or more other UE's for enabling the second UE to determine information indicative of positions of the first UE and the remaining one or more other UEs relative to the second UE;

receiving, from the second UE, information indicative of the positions of the first UE and the remaining one or more other UEs relative to the second UE; and transmitting, to the location server, the information indicative of the positions of the remaining one or more other UEs relative to the second UE.

In some but not necessarily all examples, the RAN node may comprise means for:

transmitting, to each of the one or more other UEs, positioning configuration information for configuring each of the one or more other UEs to perform a device-to-device communication channel based positioning procedure with each of the one or more other UEs and the respective remaining one or more other UE's for enabling each of the one or more other UEs to determine information indicative of positions of each of the one or more other UEs and the respective remaining one or more other UEs relative to each of the one or more other UEs;

receiving, from each of the one or more other UEs, information indicative of the positions of the respective remaining one or more other UEs relative to each of the one or more other UEs; and transmitting, to the location server, the information indicative of the positions of the respective remaining one or more other UEs relative to each of the one or more other UEs.

In some but not necessarily all examples, the location server may comprise means for:

determining a position of the first UE;

determining one or more positions of the one or more UEs based at least in part on the position of the first UE and the information indicative of one or more positions of the one or more other UEs relative to the first UE.

In some but not necessarily all examples, the location server may comprise means for:

determining a position of each of the one or more other UEs;

causing transmission, to each of the one or more other UEs, of positioning configuration information for configuring each of the one or more other UEs to perform a device-to-device communication channel based positioning procedure with each of the one or more other UEs and the respective remaining one or more other UE's for enabling each of the one or more other UEs to determine information indicative of positions of the first UE and the respective remaining one or more other UEs relative to each of the one or more other UEs;

receiving, from each of the one or more other UEs, information indicative of the positions of the first UE and the respective remaining one or more other UEs relative to each of the one or more other UEs; and determining positions of the first UE and the respective remaining one or more other UEs based at least in part on the position of each of the one or more other UEs and the information indicative of the positions of the first UE and the respective remaining one or more other UEs relative to each of the one or more other UEs.

While the above examples and optional features are described separately, it is to be understood that their provision in all possible combinations and permutations is contained within the disclosure.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which.

Figure 1:
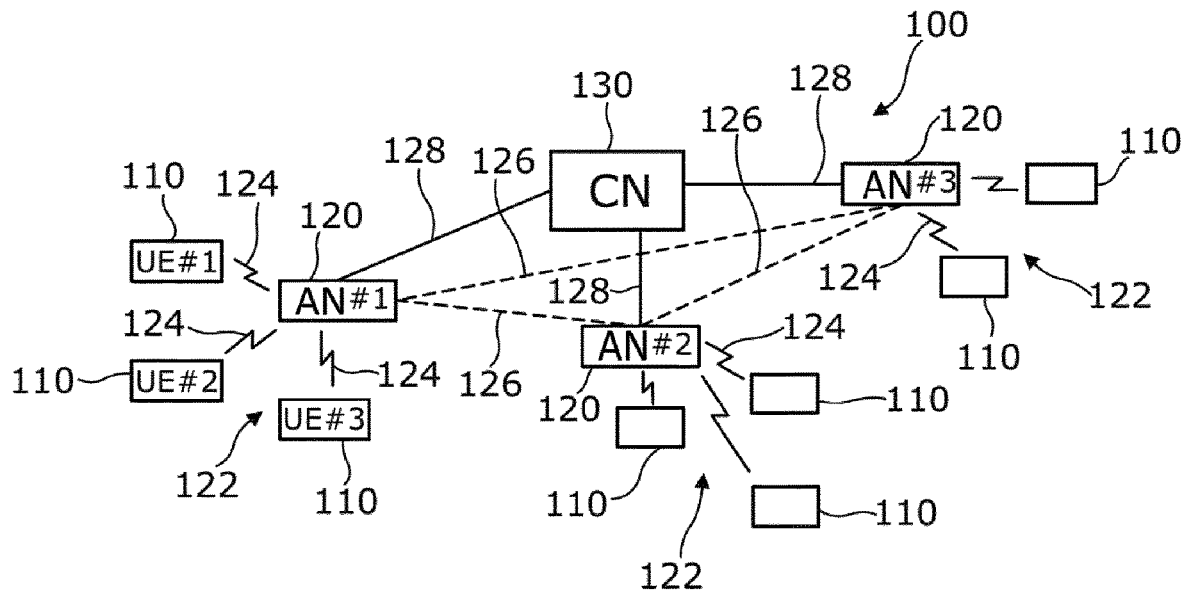
FIG. 1 shows an example of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

ABBREVIATIONS

AOA Angle Of Arrival
D2D Device-to-device
DMRS Demodulation Reference Signal
eMTC enhanced Machine Type Communication
IoT Internet of Things
LMC Location Management Component
LMF Location Management Function (Location Server)
NB-IoT NarrowBand-Internet of Things
NR New Radio (5G)
PC5 3GPP based D2D interface (designated as PC5, also known as sidelink at the physical layer)

PRS Position Reference Signal
RAN Radio Access Network
RTT Round Trip Time
SRS Sounding Reference Signal
TDOA Time Difference Of Arrival
UTDOA Uplink Time Difference of Arrival
UE User Equipment

DETAILED DESCRIPTION

The figures schematically illustrate, and the following description describes, various examples of User Equipment, UE (110), comprising means (500) for:
  receiving (201), from a Radio Access Network, RAN, node (120), positioning configuration information (801, 801') for configuring the UE to perform a device-to-device communication channel based positioning procedure (803,803') with one or more other UEs (110a, 110b) for enabling the UE to determine information (804) indicative of one or more positions of the one or more other UEs relative to the UE;
  performing (202), based at least in part on the configuration information, the device-to-device communication channel based positioning procedure and determining therefrom information indicative of the one or more positions of the one or more other UEs relative to the UE; and
  transmitting (203), to the RAN node, the information indicative of the one or more positions of the one or more other UEs relative to the UE.

FIG. 1 schematically illustrates an example of a network 100 comprising a plurality of network nodes including terminal nodes 110 (also referred to as User Equipment, UE), access nodes 120 (also referred to as RAN nodes), and core network 130.

The terminal nodes 110 and access nodes 120 communicate with each other. The core network 130 communicates with the access nodes 120 via backhaul interface 128 (e.g., 51 and/or NG interface). One or more core nodes of the core network 130 may, in some but not necessarily all examples, communicate with each other. The one or more access nodes 120 may, in some but not necessarily all examples, communicate with each other.

The network 100 may be a cellular network comprising a plurality of cells 122 each served by an access node 120. The interfaces between the terminal nodes 110 and the access nodes 120 are radio interfaces 124. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e. Multi Radio Access Technology-Dual Connection (MR-DC), not least for example such as:
  Evolved Universal Terrestrial Radio Access-New Radio Dual Connectivity (EUTRA-NR-DC, also referred to as EN-DC),
  New Radio-Evolved Universal Terrestrial Radio Access Dual Connectivity (NR-EUTRA-DC, also referred to as NE-DC),
  Next Generation Radio Access Network Evolved Universal Terrestrial Radio Access-New Radio Dual Connectivity (NG-RAN E-UTRA-NR Dual Connectivity, also referred to as NGEN-DC), or
  New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node can be implemented as a single network equipment, or disaggregated/distributed over two or more RAN nodes, such as a central unit (CU), a distributed unit (DU), a remote radio head-end (RRH), using different functional-split architectures and different interfaces.

The terminal nodes 110 are devices that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

In the following description, an access node 120 will be referred to as an RAN node 120 (e.g. NG-RAN node such as a gNB), and a terminal node 110 will be referred to as a UE 110.

Various examples of the disclosure, make use of NR-LITE (also referred to as NR-Light). NR-LITE is currently subject to standardization as part of 3GPP Release 17. NR-LITE seeks to provide new use cases with Internet of Things (IoT) type of requirements (e.g. low-complexity, enhanced coverage, long battery life, and massive number of devices) that cannot be met by enhanced Machine Type Communication (eMTC) and NarrowBand-Internet of Things (NB-IoT).

The requirements and use cases for NR-LITE are:
  Data rates up to 10-100 Mbps to support e.g. live video feed, visual production control, process automation Latency of around 10-30 ms to support e.g. remote drone operation, cooperative farm machinery, time-critical sensing and feedback, remote vehicle operation Positioning accuracy of 30 cm-1 m to support e.g. indoor asset tracking, coordinated vehicle control, remote monitoring Module cost comparable to LTE Coverage enhancement of [10-15] dB compared to Enhanced Mobile Broadband (eMBB)

Battery life 2-4 times longer than eMBB

The targeted NR-LITE features are:

Reduced bandwidth operation

Complexity reduction techniques

Coverage and reliability enhancements

D2D communication

Early data transmission

Wake-up signal in idle mode

Grant-free transmission

Figure 1A:
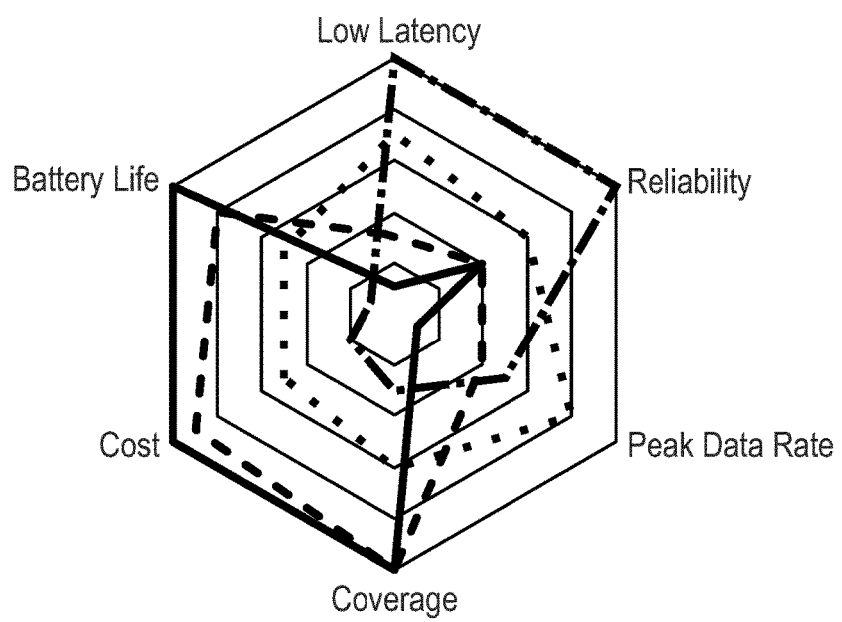
FIG. 1A shows an example of the subject matter described herein.

FIG. 1A illustrates a spider diagram of the requirements of NR-LITE relative to NB-IOT, eMTC and Ultra-Reliable Low-Latency Communication (URLLC).

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations, schematic block diagrams and signalling diagrams. It will be understood that each block (of the flowchart illustrations, block diagrams and signalling diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Figure 2:
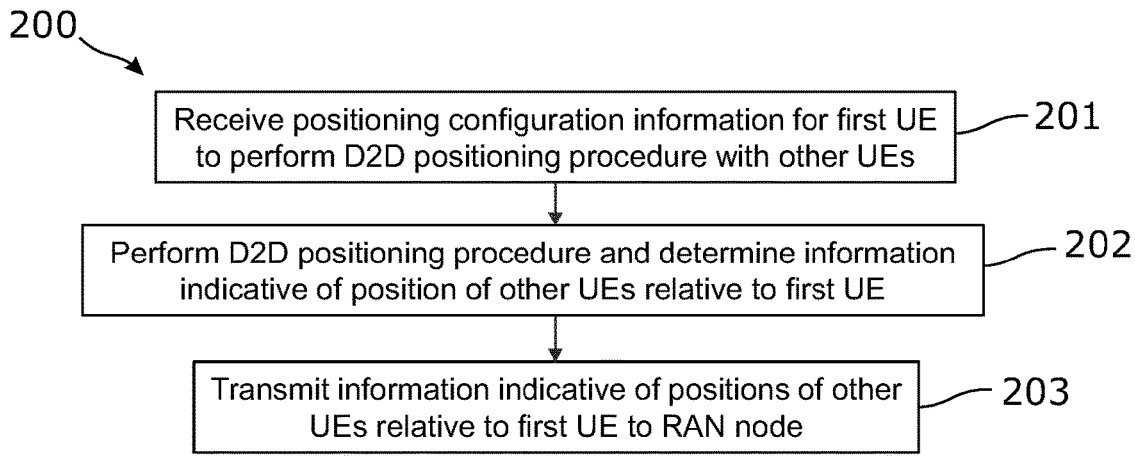
FIG. 2 shows another example of the subject matter described herein.

FIG. 2 schematically illustrates an example of a method 200 according to the present disclosure that can be implemented by a UE.

The method comprises, at block 201, the UE receiving positioning configuration information, from a RAN node, for configuring the UE to perform a device-to-device (D2D) communication channel-based positioning procedure with one or more other UEs. Device-to-device (D2D) communications, which may be referred to as "Sidelink communications" or "Sidelink channels", may be performed between UEs that can also be in communication with a cellular network. D2D communications may use a PC5 interface. PC5 refers to a reference point where the UE directly communicates with another UE over the direct channel. In this case, the communication with a RAN node/base station is not required. D2D communications may be short-range, network-less, direct communications.

Direct communication in LTE uses the Sidelink for communication between devices and is defined by the PC5 interface. The radio interface for Sidelink consists of 3 layers that include the physical layer (PHY), the medium access control (MAC), and Radio Resource Control (RRC). Detailed descriptions of these layers are provided in 3GPP 36.201 and its reference documents. Sidelink in New Radio (NR) is defined in 3GPP's release 16 of 5G NR.

The device-to-device communication channel, and the D2D communication channel-based positioning procedure, may be referred to hereinafter as a sidelink and a sidelink positioning procedure respectively. The sidelink positioning procedure enables the UE to determine information indicative of the position of each of one more other UEs relative to the UE. Such other UEs may be referred to hereinafter as proximal devices, i.e. in that they are nearby the UE/within sidelink communication range of the UE.

As used herein, the term "determine/determining" (and grammatical variants thereof) can include, not least: calculating, computing, processing, deriving, investigating, looking up (for example, looking up in a table, a database or another data structure), ascertaining and the like. Also, "determine/determining" can include receiving (for example, receiving information), accessing (for example, accessing data in a memory) and the like. Also, "determine/determining" can include resolving, selecting, choosing, establishing, and the like.

The information indicative of the positions of each of the other UEs may be information indicative of a temporal or angular metric/parameter that is dependent upon the relative position of the UE and each other UE. Such information may be indicative of, not least for example, a Round Trip Time (RTT) and/or an Angle of Arrival (AOA).

At block 202, based at least in part on the configuration information, the UE performs the D2D communication channel-based positioning procedure to determine the information indicative of the one or more positions of the one or more other UEs relative to the UE.

At block 203, the UE transmits, to the RAN node, the information indicative of the one or more positions of the one or more other UEs relative to the UE.

The D2D communication channel-based positioning procedure may comprise the UE transmitting/broadcasting a first reference signal. The first reference signal may be a position reference signal, such as Sounding Reference Signal (SRS), transmitted/broadcasted by the UE over a UE-to-RAN communication channel via the Uu interface that is received by the other UEs. Alternatively, the first reference signal may be a position reference signal, that may be substantially similar/the same as the SRS, albeit transmitted over the D2D communication channel via a PC5 interface. Each other UE receives, measures and decodes the first reference signal and may determine therefrom the arrival time, the received power and the angle of arrival of the first reference signal. Each other UE transmits its own (second) reference signal (e.g. a position reference signal that may be substantially similar/the same as the SRS, albeit transmitted over the D2D communication channel via a PC5 interface) to the UE. The UE can then measure and decode each reference signal received from the other UEs and determine therefrom the arrival times, the received powers and the angles of arrival of such received reference signals. Each other UE may also transmit time information for enabling the UE to determine a Round Trip Time (RTT). Such time information may be indicative of a time period between each UE's receipt of the first reference signal and the transmission of its own (second) reference signal. Following the performance of such a D2D communication channel-based positioning procedure, and the determination of information indicative of the one or more positions of the one or more other UEs relative to the UE (e.g. not least RTT and AOA), an estimation of a position of each other UE relative to the UE can be determined.

Such relative positioning the UE and the other UEs can be used in conjunction with an absolute position of the UE to determine an estimate for the absolute positions of the other UEs.

The D2D communication channel-based positioning procedure may comprise the UE transmitting/broadcasting/multicasting and receiving a reference signal. The reference signals could be one of or similar to the CSI-RS (Channel State Information-Reference Signal), Synchronization Signals (SSBs), Sidelink Primary/Secondary Synchronization Signal (SPSS/SSSS), Downlink positioning reference signals (DL PRS), Uplink positioning reference signals (UL PRS) and Sounding Reference Signals (SRS). The positioning reference signals may have configurable signal bandwidth, frequency and time allocation. The reference signals may use beam sweeping and beam alignment and allow transmissions with periodic and/or on-demand resource allocation. Reference signals may support shared time/frequency reference signal resources with other transmissions including data and control channels.

The absolute position of the UE may be determined via any suitable technique, not least a network-based positioning, for example such as Uplink (UL)-based positioning. UL-based positioning, may be based on that defined in 3GPP Release 15 using SRSs with 3GPP Release 16 extensions. In the UL-based positioning procedure, the UE transmits/broadcasts SRSs, i.e. to serving and neighbouring RAN nodes. Based on the received SRSs, the RAN nodes can measure and report (to a location server/Location Management Function (LMF)/Location Management Component (LMC)) the arrival time, the received power and the angle of arrival from which the position of the UE can be estimated. A time difference between DL (Downlink) reception and UL transmission can also be reported and used to determine RTT based positioning schemes, where the distance between a RAN node and a UE can be determined based on the estimated RTT. By combining several such RTT measurements, involving different RAN nodes, the UE position can be determined.

In order to perform the D2D communication channel-based positioning procedure, the UE may transmit, to the one or more other UEs via the D2D communication channel/PC5 interface, second configuration information for configuring the one or more other UEs to:
  receive a first reference signal from the UE,
  transmit, in response to receipt of the first reference signal, a second reference signal to the UE; and
  transmit time information for enabling the UE to determine an RTT.

In some examples, the second configuration information comprises:
  information related to a first reference signal to be received from the UE (for example, information for configuring the one or more other UEs to receive a first reference signal from the UE);
  information related to a second reference signal to be transmitted by the one or more other UEs (for example, information for configuring the one or more other UEs to transmit, in response to receipt of the first reference signal, a second reference signal to the UE); and
  a request for time information (for example, information for configuring the one or more other UEs to transmit time information for enabling the UE to determine an RTT).

The second configuration information and transmission of the same may be based at least in part on the configuration information received by the UE from the RAN node.

The first reference signal may be transmitted/broadcast either:
  over a UE-to-RAN communication channel via the Uu interface, or
  over the D2D communication channel via the PC5 interface.

Where the first reference signal is transmitted/broadcasted over the UE-to-RAN communication channel, the first reference signal may be a positioning reference signal transmitted as part of a network positioning procedure. I.e. the first reference signal received by the other UEs may correspond to an SRS transmitted/broadcasted by the UE to RAN nodes as part of a UL-based positioning procedure.

The first and/or second reference signals may be configured such that its bandwidth is less than 5 MHz or less than 20 MHz. Advantageously, the use of such relatively low bandwidth signals (as compared to the normal wideband signals used for network UL/DL positioning of the order of 100 MHz) may enable simpler receivers/transmitters/transceivers and hence simplified/more basic UE devices. This may thereby allow lower powered UE devices to be used that prolongs battery life (and reduces manufacturing costs). Such operational bandwidth also enables the UE devices to conform to NR-LITE devices.

Typically, one of the key elements in accurate positioning is to either receive or transmit a wideband signal (e.g. 100 MHz or more dependent on the accuracy target) for downlink or uplink-based positioning. Accordingly, both downlink and uplink-based positioning would thereby require a wideband device/UE, which is both power consuming and costly. Key Performance Indicators (KPIs) for IoT devices such as asset tags/location tags (i.e. tags associated with an asset/item/object for enabling positioning/localisation of the asset/item/object) are power consumption and cost. However, a wide bandwidth requirement is conflicting with NR-LITE for which one of the objectives is to reduce the bandwidth to reduce power consumption and cost. The current target for NR-LITE is to reduce bandwidth to 5 or 20 MHz, discussion to be agreed in 3GPP Rel. 17 SI. It will not be possible to support e.g. 100 MHz or more as required for the positioning. A further issue is the cost of NR-LITE. A target for the NR-LITE cost reduction is a modem in the cost range of an LTE modem, which is still significantly too much compared to low cost assets tracking, where the cost position should be in the sub US Doller (USD) range.

The obtainable positioning accuracy can be approximated by: $c/(4*BW)$, where c=speed of light and BW=bandwidth. For example, there would be a positioning accuracy of ~75 cm @100 MHz.

As will be discussed below, examples of the disclosure may enable accurate positioning using a 5 MHz NR-LITE based solution by jointly using proximity devices for sidelink relative positioning along with course network based absolute positioning, wherein both such position procedures are constrained to using signalling and reference signals within NR-LITE bandwidths, e.g. <5 or <20 MHz. Examples of the disclosure may thereby provide low power (and low cost) asset tracking, wherein assets/items are associated with UEs having NR-LITE connectivity with the network. This also helps ensure good tracking area coverage.

Figure 3:
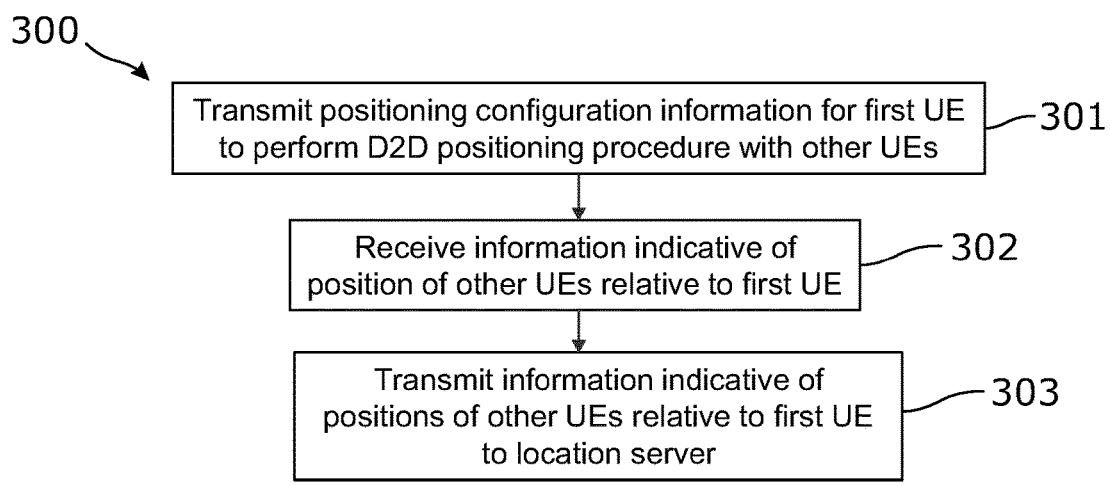
FIG. 3 shows another example of the subject matter described herein.

FIG. 3 schematically illustrates an example of a method 300 according to the present disclosure that can be implemented by a RAN node.

The method comprises, at block 301, the RAN node transmitting to a first UE, positioning configuration information for configuring the first UE to perform a D2D communication channel-based positioning procedure with one or more other UEs. The D2D communication channel may be a sidelink channel over a PC5 interface. The positioning configuration information may for example comprise of assistance data related to positioning reference symbols, information about the positioning reference symbol resources and/or resource identity list, position calculation assistance data, positioning reference cell information, positioning neighbour cell information and/or neighbour cell list, positioning capability information. The said positioning configuration information may be used in communication with RAN node and/or between the first UE and with one or more other UEs provisioned with the sidelink related positioning configuration information.

The D2D communication channel-based positioning procedure enables the first UE to determine information indicative of the position of each of one more other UEs relative to the first UE.

The information indicative of the positions of each of the other UEs may be information indicative of a temporal or angular metric/parameter that is dependent upon the relative position of the first UE and each other UE. Such information may be indicative of, not least for example, a Round Trip Time (RTT) and/or an Angle of Arrival (AOA).

At block 302, the RAN node receives, from the first UE, the information indicative of the one or more positions of the one or more other UEs relative to the first UE (i.e. such information having been determined by the first UE having performed the D2D communication channel-based positioning procedure with the other UEs).

At block 303, the RAN node transmits, to a location server, the information indicative of the one or more positions of the one or more other UEs relative to the first UE.

The location server may provide a location service to the network. In some examples, the location server is a Location Management Function (LMF), i.e. a network entity in the 5G Core Network (5GC) supporting the following functionality:
supporting location determination for a UE.
obtaining downlink location measurements or a location estimate from the UE.
obtaining uplink location measurements from the NG RAN.
obtaining non-UE associated assistance data from the NG RAN.

As will be discussed further below, the location server can use the information indicative of the one or more positions of the one or more other UEs relative to the first UE, along with other positioning related information (e.g. not least an absolute position of the first UE) to determine the absolute position of each of the UEs.

Moreover, as will be discussed further below, by iteratively repeating the entire process with some or all of the other UEs (i.e. sequentially configuring each of the other UE to perform the D2D communication channel based positioning procedure with the first UE and remaining other UEs), more accurate positions of the first UE as well as each of the other UEs can be determined (e.g. by averaging out each of the determined positions from each iteration/performance of the D2D communication channel based positioning procedure).

In order to determine an absolute position of the first UE (which can be used with positions of the other UEs to determine the absolute positions of the other UEs) a network-based positioning procedure for determining UE position may be employed. Such a network-based positioning procedure may comprise a RAN-to-device communication channel-based positioning procedure (cf. a D2D communication channel-based positioning procedure). Such a RAN-to-device communication channel-based positioning procedure may be a UL or DL based positioning procedure. Alternatively, the UE may be able to determine and report its absolute position via a Global Navigation Satellite System (GNSS) module.

In some examples, in order to determine the absolute position of each of the UEs, the RAN node may transmit, to the first UE, further positioning configuration information for configuring the first UE to perform a RAN-to-device communication channel-based positioning procedure for enabling a determination of information indicative of a position of the first UE. Such a RAN-to-device communication channel-based positioning procedure may be a UL based positioning procedure, e.g. Uplink Time Difference of Arrival (UL-TDOA), wherein the UE transmits a first positioning reference signal to the RAN node (and neighbouring RAN nodes) to be received, measured and decoded. The receipt of such signals is reported to a location server, LMF or LMC. Also, further information may be reported, not least such as one or more of: the arrival time/time of receipt, angle of arrival and the received power of the first reference signal.

Responsive to the transmission of the information indicative of positions of one or more other UEs relative to the first UE (e.g. RTT and AOA) to the location server, the RAN node may receive a selection from the location server of a second UE from the one of more other UEs. The RAN node may then transmit, to the selected second UE, second positioning configuration information for configuring the second UE to perform a D2D communication channel-based positioning procedure. Such a procedure being performed with both the first UE and the remaining one or more other UE's for enabling the second UE to determine information indicative of positions of the first UE and the remaining one or more other UEs relative to the second UE. Following performance of this positioning procedure, the RAN node may receive, from the second UE, information indicative of the positions of the first UE and the remaining one or more other UEs relative to the second UE. The RAN node may then transmit, to the location server, the information indicative of the positions of the remaining one or more other UEs relative to the second UE.

The D2D communication channel-based positioning procedure may then be repeated for each of the other remaining UEs so as to respectively obtain information indicative of positions of each of the UEs relative to each of the other UEs. In this regard, the RAN node may transmit, to each of other UEs, positioning configuration information for configuring each of the other UEs to perform a D2D communication channel-based positioning procedure with each of the other UEs and the respective remaining other UE's. Following the performance of such positioning procedures by each UE, the RAN node receives, from each of the other UEs, information indicative of the positions of the respective remaining UEs relative to each of the other UEs. The RAN node then sends this information to the location server. The D2D communication channel-based positioning procedure may be repeated two to three times, or may be repeated for all of a group of UEs sharing the same group identifier.

Figure 4:
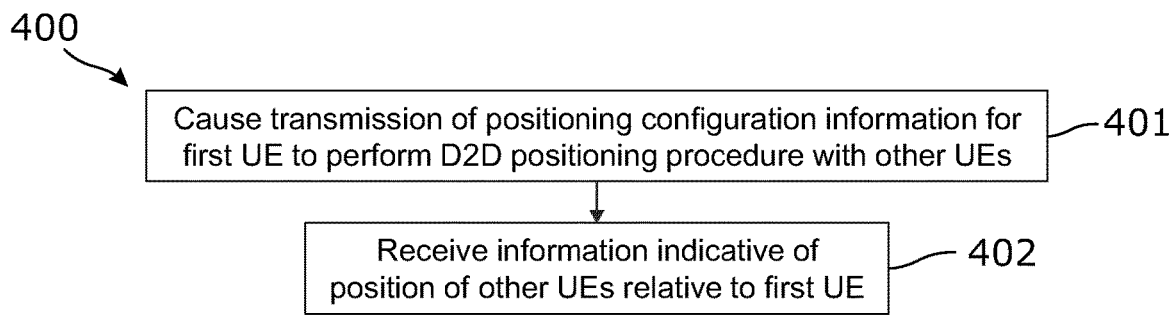
FIG. 4 shows another example of the subject matter described herein.

FIG. 4 schematically illustrates an example of a method 400 according to the present disclosure that can be implemented by a location server, such as an LMF or LMC.

The method comprises, at block 401, the location server invokes a D2D communication channel-based positioning procedure by causing the transmission of, i.e. via a RAN node, positioning configuration information to a first UE, wherein the positioning configuration information configures the first UE to perform the D2D communication channel-based positioning procedure with one or more other UEs.

At block 402, the location server receives, receives from the first UE via the RAN node, information indicative of the one or more positions of the one or more other UEs relative to the first UE (i.e. such information having been determined by the first UE having performed the D2D communication channel-based positioning procedure with the other UEs). The information may further include position information of the first UE calculated based on the SRS received by the RAN node.

The location server may determine a position of the first UE (e.g. by requesting its positions or triggering a RAN-to-device communication channel-based positioning procedure, such as a UL-TDOA procedure).

The location server may then determine one or more positions of the one or more UEs based at least in part on the position of the first UE and the received information indicative of one or more positions of the one or more other UEs relative to the first U E.

The above process may be repeated for the other UEs, to obtain a set of positions (i.e. a set of calculated/estimated positions) of each of the UEs, from which an average position, or weighted average position, can be determined for each UE, thereby improving the accuracy of the determined position of each UE.

In this regard, the location server may, for each of the one or more other UEs:
  determine a position of each of the one or more other UEs (e.g. by performing a UL-TDOA procedure for each UE);
  cause transmission, to each of the one or more other UEs, of positioning configuration information for configuring each of the one or more other UEs to perform a D2D communication channel-based positioning procedure with each of the one or more other UEs and the respective remaining one or more other UE's;
  receive, from each of the one or more other UEs, information indicative of the positions of the first UE and the respective remaining one or more other UEs relative to each of the one or more other UEs (e.g. RTT and AOA); and
  determine positions of the first UE and the respective remaining one or more other UEs based at least in part on the position of each of the one or more other UEs and the information indicative of the positions of the first UE and the respective remaining one or more other UEs relative to each of the one or more other UEs.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

Figure 5:
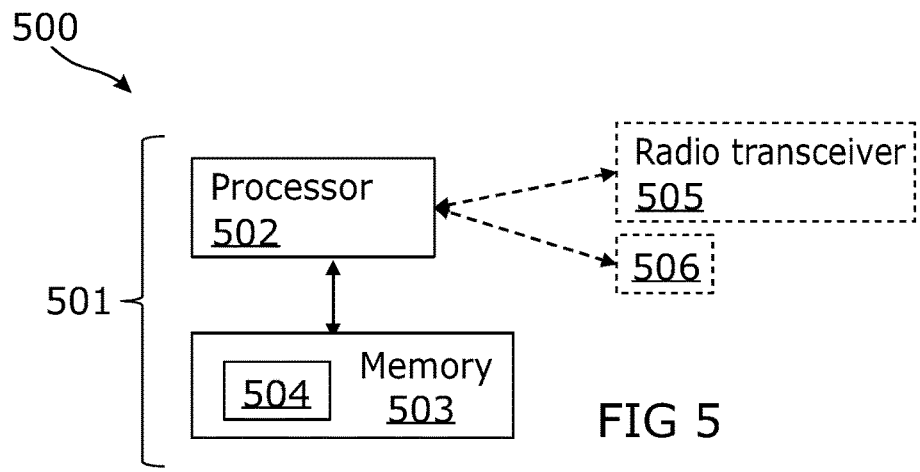
FIG. 5 shows another example of the subject matter described herein.

FIG. 5 schematically illustrates a block diagram of an apparatus 500 for performing the methods, processes, procedures and signalling described in the present disclosure and illustrated in FIGS. 2, 3, 4, 8 and/or 9. The component blocks of FIG. 5 are functional and the functions described may or may not be performed by a single physical entity.

The apparatus comprises a controller 501, which could be provided within a device such as a UE 110, a RAN node 120, or a location server.

The controller 501 can be embodied by a computing device, not least such as those mentioned above. In some, but not necessarily all, examples, the apparatus can be embodied as a chip, chip set or module, i.e. for use in any of the foregoing. As used here 'module' refers to a unit or apparatus that excludes certain parts/components that would be added by an end manufacturer or a user.

Implementation of the controller 501 may be as controller circuitry. The controller 501 may be implemented in hardware alone, have certain aspects in software including firmware alone or can be a combination of hardware and software (including firmware).

As illustrated in FIG. 5 the controller 501 may be implemented using instructions that enable hardware functionality, for example, by using executable instructions of a computer program 504 in a general-purpose or special-purpose processor 502 that may be stored on a computer readable storage medium 503 (disk, memory etc) to be executed by such a processor 502.

The processor 502 is configured to read from and write to the memory 503. The processor 502 may also comprise an output interface via which data and/or commands are output by the processor 502 and an input interface via which data and/or commands are input to the processor 502. The apparatus may be coupled to a radio transceiver 505. The apparatus may further comprise one or more other components 506 (not least for example: sensors, user interface elements and/or other modules/devices).

The memory 503 stores a computer program 504 comprising computer program instructions (computer program code) that controls the operation of the apparatus 500 when loaded into the processor 502. The computer program instructions, of the computer program 504, provide the logic and routines that enables the apparatus to perform the methods, processes, procedures and signalling described above and illustrated in FIG. 2, 3 or 4. The processor 502 by reading the memory 503 is able to load and execute the computer program 504.

Although the memory 503 is illustrated as a single component/circuitry it may be implemented as one or more separate components/circuitry some or all of which may be integrated/removable and/or may provide permanent/semi-permanent/dynamic/cached storage.

Although the processor 502 is illustrated as a single component/circuitry it may be implemented as one or more separate components/circuitry some or all of which may be integrated/removable. The processor 502 may be a single core or multi-core processor.

Figure 8:
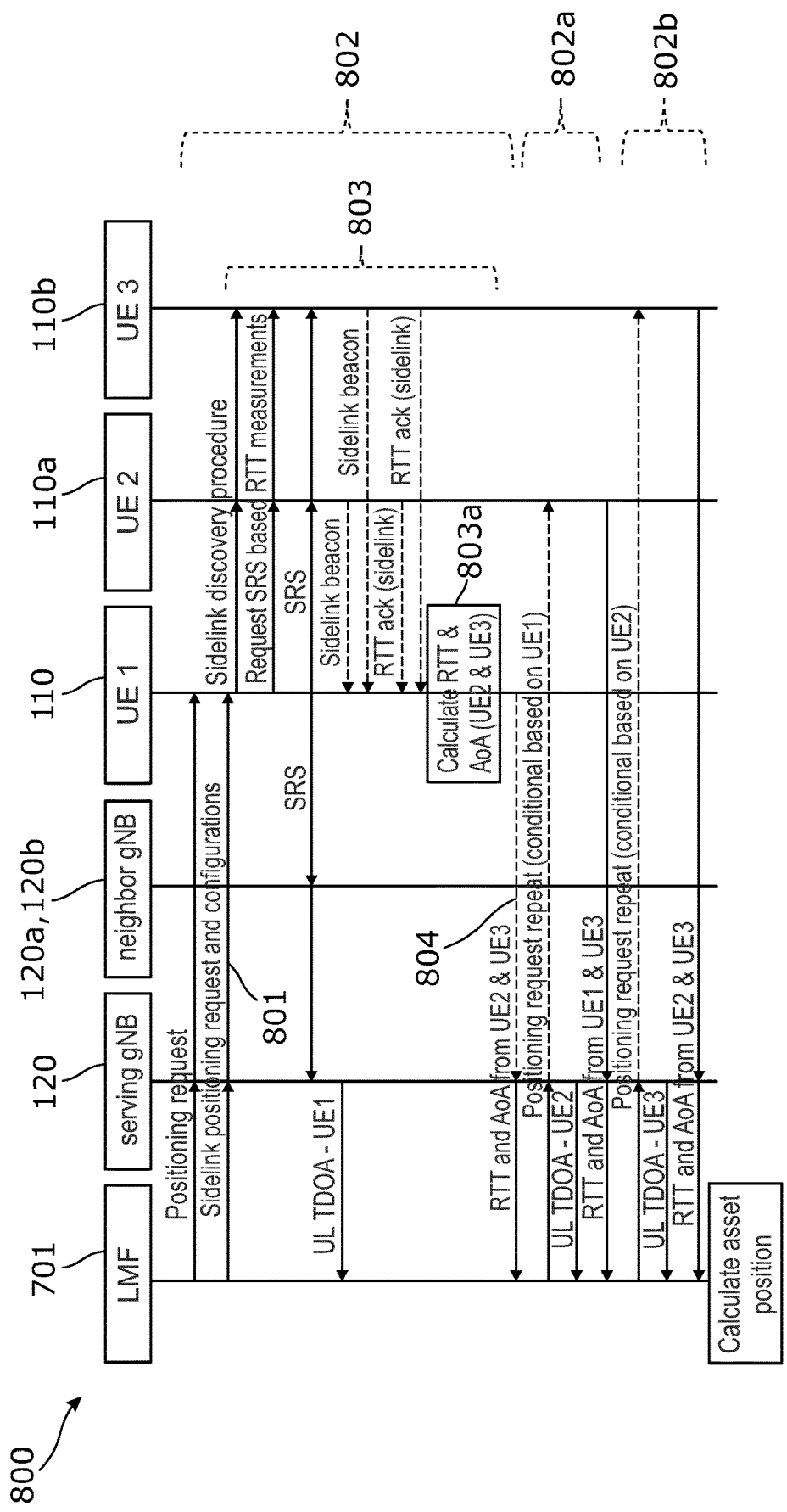
FIG. 8 shows another example of the subject matter described herein.
Figure 9:
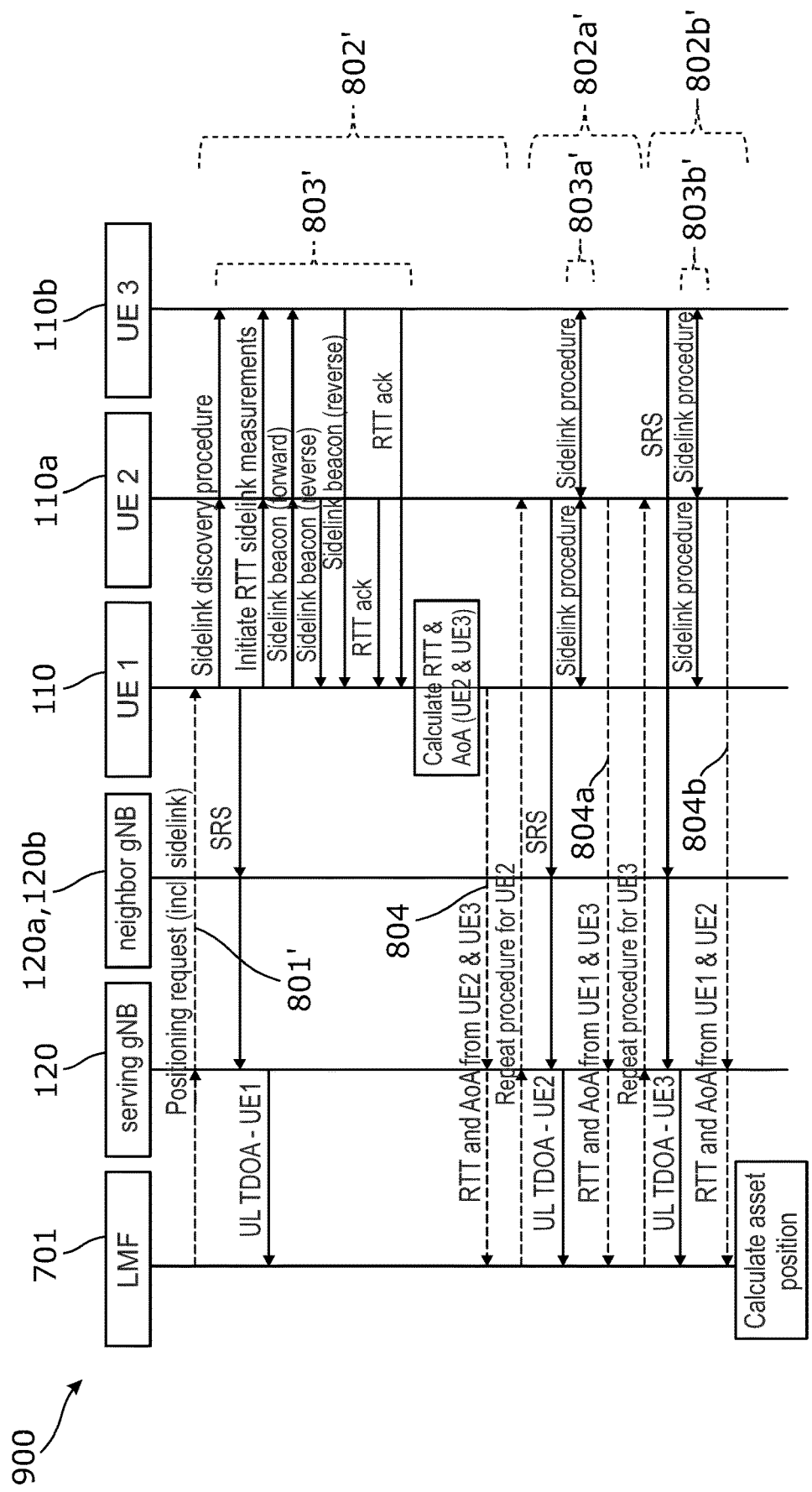
FIG. 9 shows another example of the subject matter described herein.

The apparatus may include one or more components for effecting the above described method of FIG. 2, 3 or 4, and at the signaling of FIGS. 8 and 9. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e. for use in any of the foregoing.

In one example, the apparatus is embodied on a hand held portable electronic device, such as a mobile telephone, wearable computing device or personal digital assistant, that can additionally provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

In examples where the apparatus is provided within a UE 110, the apparatus comprises: at least one processor 502; and
at least one memory 503 including computer program code
the at least one memory 503 and the computer program code configured to, with the at least one processor 502, cause the apparatus at least to perform:
receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;
performing, by the UE based at least in part on the configuration information, the device-to-device communication channel based positioning procedure and determining therefrom information indicative of the one or more positions of the one or more other UEs relative to the UE; and
transmitting, from the UE to the RAN node, the information indicative of the one or more positions of the one or more other UEs relative to the UE.

In examples where the apparatus is provided within a RAN node 120, the apparatus comprises:
at least one processor 502; and
at least one memory 503 including computer program code
the at least one memory 503 and the computer program code configured to, with the at least one processor 502, cause the apparatus at least to perform:
transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;
receiving, at the RAN node from the first UE, information indicative of the one or more positions of the one or more other UEs relative to the first UE; and
transmitting, from the RAN node to a location server, the information indicative of the one or more positions of the one or more other UEs relative to the first UE.

In examples where the apparatus is provided within a location server, the apparatus comprises:
at least one processor 502; and
at least one memory 503 including computer program code
the at least one memory 503 and the computer program code configured to, with the at least one processor 502, cause the apparatus at least to perform:
causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and
receiving, at the location server, information indicative of the one or more positions of the one or more other UEs relative to the first UE.

According to some examples of the present disclosure, there is provided a system (e.g. at least one UE 110, a RAN node 120 and a location server).

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

Figure 6:
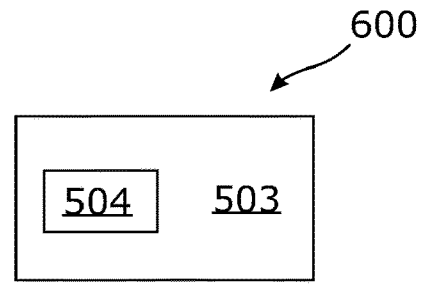
FIG. 6 shows another example of the subject matter described herein.

FIG. 6, illustrates a computer program 504. The computer program may arrive at the apparatus 500 via any suitable delivery mechanism 600. The delivery mechanism 600 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 504. The delivery mechanism may be a signal configured to reliably transfer the computer program. The apparatus 500 may propagate or transmit the computer program as a computer data signal.

In certain examples of the present disclosure, there is provided computer program instructions for causing a UE 110 to perform at least the following or for causing performing at least the following:
  receiving, at a UE from a Radio Access Network, RAN, node, positioning configuration information for configuring the UE to perform a device-to-device communication channel based positioning procedure with one or more other UEs for enabling the UE to determine information indicative of one or more positions of the one or more other UEs relative to the UE;
  performing, by the UE based at least in part on the configuration information, the device-to-device communication channel based positioning procedure and determining therefrom information indicative of the one or more positions of the one or more other UEs relative to the UE; and
  transmitting, from the UE to the RAN node, the information indicative of the one or more positions of the one or more other UEs relative to the UE.

In certain examples of the present disclosure, there is provided computer program instructions for causing a RAN node 120 to perform at least the following or for causing performing at least the following:
  transmitting, from Radio Access Network, RAN, node to a first User Equipment, UE, positioning configuration information for configuring the first UE to perform a device-to-device communication channel based positioning procedure with one or more other UEs for enabling the UE to determine information indicative of one or more positions of the one or more other UEs relative to the first UE;
  receiving, at the RAN node from the first UE, information indicative of the one or more positions of the one or more other UEs relative to the first UE; and
  transmitting, from the RAN node to a location server, the information indicative of the one or more positions of the one or more other UEs relative to the first UE.

In certain examples of the present disclosure, there is provided computer program instructions for causing a location server to perform at least the following or for causing performing at least the following:
  causing transmission, from a location server to a first User Equipment, UE, of positioning configuration information for configuring the first UE to perform a device-to-device communication channel based positioning procedure with one or more other UEs for enabling the first UE to determine information indicative of one or more positions of the one or more other UEs relative to the first UE; and
  receiving, at the location server, information indicative of the one or more positions of the one or more other UEs relative to the first UE.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 7:
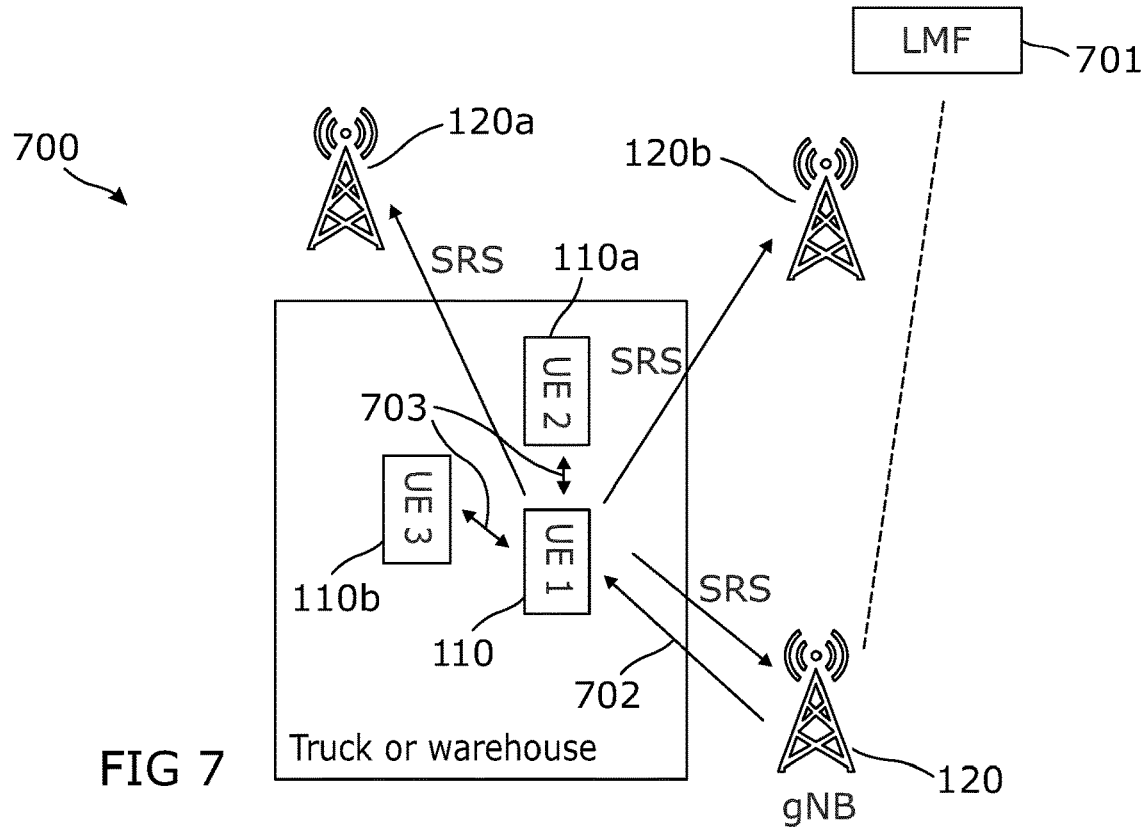
FIG. 7 shows another example of the subject matter described herein.

FIG. 7 schematically illustrates a system 700 according to the present disclosure. The system comprises a first UE 110 and other UEs 110a, 110b with D2D communication channel capabilities, e.g. sidelink communication capabilities via a PC5 interface. The other UEs are proximal to the first UE, i.e. within sidelink range. In this particular example, all the UEs are within a truck or warehouse, though it is of course appreciated that the system can be deployed in other differing use case environments and scenarios.

The system further comprising a serving RAN node 120 and neighbouring RAN nodes 120a, 120b. The system also comprises a location server/LMF 701. The same functionality could be provided by an LMC, which can support low latency processing of the measurements in NG-RAN.

In overview, when a position of the first and other UE's is requested, the location server invokes a network-based positioning method (e.g. UL TDOA) to determine the position of the first UE, and it also invokes a sidelink-based positioning method to determine the position of the other UEs relative to the first U E.

The UE may be requested to perform and duly configured to perform each of the network-based positioning method and the sidelink-based positioning method via appropriate signaling 702 from the serving RAN node.

The network-based positioning method may involve the first UE transmitting/broadcasting a positioning reference signal (such as an SRS via Uu interface) which is received, decoded and measured by the serving and neighbouring RAN nodes which then communicate their measurement results to the location server. Based on the measurement results (and knowledge of the absolute and fixed positions/locations of the RAN nodes), the location server may determine, using triangulation/multilateration, the first UE's position.

The sidelink-based positioning method may involve the first UE transmitting/broadcasting a positioning reference signal (such as the same SRS via the Uu interface mentioned above or a similarly configured positioning reference signal via the PC5 interface) which is received, decoded and measured by the other UEs. The other UEs then transmit their own positioning reference signal to the first UE. Based on the exchange of signals 703 between the UEs, and the measurement results therefrom, the first UE can determine positioning parameters/metrics indicative of the positions of the other UE's relative to the first UE itself, e.g. positioning parameters/metrics indicative of a vector relative to the first UE—such as RTT and AOA. Such positioning parameters/metrics are transmitted, via the RAN node (over Uu interface), to the location server which may determine the positions of the other UE's relative to the first UE and, based on knowledge of the first UE's absolute position, the absolute position of each of the other UEs.

FIG. 8 is a signaling diagram showing an example of the signaling 800 involved between the network entities of FIG. 7, namely:
the location server 701 (referred to herein as LMF),
the serving and neighbouring RAN nodes 120 and 120a, 120b (referred to herein as serving gNB and neighbor gNBs)
the first and other UEs 110 and 110a, 110b (referred to herein as UE1, UE2 and UE3).

The LMF invokes the positioning procedure 802, which comprises both network-based positioning (i.e. RAN-to-device positioning such as a UL TDOA positioning method) of UE1 and also device-based positioning 803 (i.e. D2D communication channel-based positioning such as a sidelink-based positioning method as discussed further below) of the positions of UE2 and UE3 relative to the UE1.

The LMF 701 configures, via the serving gNB 120, one of the UEs, in this case UE1 110, to perform the network-based positioning with a "Positioning request" message. In some examples, the LMF 701 and serving gNB 120 configure initial coarse positioning via one of the available positioning methods, such as UL-TDOA using NR-LITE radio (i.e. wherein the positioning reference signals are constrained to having a bandwidth of substantively less than 100 MHz, e.g. <20 MHz or <5 MHz). This may offer coarse positioning applications that is nevertheless sufficient for certain applications, e.g. items/assets in transit or in remote rural areas). However, as discussed below, by repeating the network-based positioning and the sidelink based positioning for some or all of the UEs, the accuracy of the determined positions of the UEs can be increased whilst keeping to NR-LITE bandwidths.

The location server 701 also configures, via the serving gNB 120, UE1 110 to perform the sidelink positioning procedure 803 with a "Sidelink positioning request and configurations" message. In some examples, the LMF 701 and serving gNB 120 configure UE1 110 for sidelink positioning so as to enable UE1 110 to act as a master positioning device (referred to herein as "master device").

Responsive to receipt of the sidelink configurations, the sidelink positioning procedure 803, is carried out. The UE1 110 initially performs a sidelink discovery procedure to identify nearby devices with sidelink capabilities. In this regard, the master device 110 scans for proximity devices with sidelink capabilities, i.e. UE2 110a and UE3 110b.

The master device then configures the discovered proximity devices to measure a positioning reference signal (e.g. an SRS beacon) to be transmitted/broadcast by the master device and request SRS based RTT measurements from the proximity device. In this regard, the master device may transmit, via the PC5 interface, a "Request SRS based RTT measurements" message.

The master device then transmits its SRS, e.g. in accordance with the request and configuration of the LMF and servicing gNB. In the present example. The SRS transmitted by UE is transmitted, via the Uu interface, to each of the serving and neighbor gNBs as well as the proximity devices UE2 and UE3. In this regard, the SRS transmitted for the network-based positioning procedure (e.g., UL TDOA) is also used for the sidelink positioning procedure.

In other examples, such as illustrated in FIG. 9 and discussed below, the positioning reference signal transmitted to the proximity devices UE2 110a and UE3 110b for the sidelink positioning procedure is not the same SRS transmitted, via the Uu interface, to the serving and neighbor gNBs. Instead, the positioning reference signal transmitted to the proximity devices UE2 and UE3 for the sidelink positioning procedure is transmitted via the PC5 interface. Such a positioning reference signal transmitted for the sidelink positioning procedure via PC5 may nevertheless have similar properties as the SRS used for the network-based UL TDOA positioning procedure (and indeed may be a narrowband signal with a bandwidth<5 or <20 MHz).

The SRS signal from the master device 110 is received, decoded and measured by the serving gNB 120 and the neighbor gNBs 120a, 120b as well as the proximity devices. In this regard, the proximity devices may need to be able to receive on all the transmission frequencies (this would require RAN4 standardization. However, most UE devices on the market has that capability from self-test in the production of the devices).

The positioning information of the master device 110 can be estimated by each of the gNBs from the results of each gNB's decoding and measurement of the SRS it received from the master device 110.

The serving gNB 120 may report the respective positioning information associated with the master device to the LMF 701 in a "UL TDOA-UE1" message, In parallel, each of the proximity devices 110a, 110b also receives, decodes and measures the SRS received from the master device and responds to the same with its own transmission of a positioning reference signal via the PC5 interface. For example, each proximity device may transmit a "Sidelink beacon" (whose characterises may be at least in part decided by the master device, being based at least in part on the configuration information received by each proximity device in the "Request SRS based RTT measurements" message).

Each proximity device may further respond to the received SRS and its transmitted sidelink beacon with information indicative of an amount of time (a "delta time") between receiving the SRS and transmitting the sidelink beacon. Such information may be provided in a "RTT ack (sidelink)" message sent to the master device.

The master device can then calculate 803a the round-trip time (RTT), e.g. not least based on a similar procedure to that UL based positioning defined in 3GPP Release 16. The master device may calculate the RTT and absolute or relative AoA (angle of arrival) from all proximity devices.

The master device may respond/report back to the serving gNB and LMF with information (804) indicative of the positions of the proximity devices relative to the master device, namely the joint RTT and AoA from all of the proximity devices, along with identifiers for each of the proximity devices. Such information may be provided in a message including RTT and AOA from UE2 & UE3 and the message is transmitted to the LMF via the serving gNB.

The LMF may use the network positioning-based determination of the absolute position of the master device along with the sidelink positioning based determination of the position of the proximity devices relative to the master device to determine the absolute position of the proximity devices.

The LMF may then trigger a new positioning procedure 802a (as indicated by "Positioning request repeat (conditional based on UE1)") based on the received information (RTT and AoA between the master device and proximity devices). In the new/repeated procedure, a new master device (e.g. UE2) is selected from one of the proximity-based devices. The selection of new master device can be based on one or more selected from the group of:
- a position within the group of UEs (such a group of UEs may be referred to as a sidelink group);
- a signal measurement quantity within the sidelink group, such as RSRP (Received Signal Reference Power)/RSRQ (Received Signal Reference Quality), crossing a predetermined value e.g. in excess of a threshold;
- UE mobility or speed characteristics, wherein the new master device represents a stationary or low/lowest mobility device of the sidelink group average mobility profile.

One or more such selection criteria could also be used for the selection of the initial master device.

In the new positioning procedure, a further network-based positioning procedure is performed to determine a course position for the newly selected master device. Also, a further sidelink positioning procedure 802a is performed for the (new) master device 110a to determine the positions of the devices near to and within sidelink range of the new master device 110a; such a newly defined set of proximity devices (i.e. UE1 110 and UE3 110b) now including the old master UE1 110. In effect, the new/further positioning procedure 802a corresponds to that of the above described position procedure 802 albeit with a differing master device.

By repeating the network based positioning and sidelink based positioning for the new master device, a new set of RTT and AOA for the proximity devices (including the old master device) relative to the new master device can be obtained and used, in conjunction with the RTT and AoA between the former master device and the former set of proximity devices, to determine the positions of each of the devices.

By further iteratively repeating/cycling the procedure 802b (i.e. further repeating both the network-based positioning and sidelink based positioning) for each of the UEs, sets of RTT and AOA values can be determined from the perspective of each UE. These can be used together to determine the positions of each of the UEs (and providing an improved accuracy of the such positions as compared to where the network-based positioning and sidelink based positioning is performed only once for the initial master device).

Once the LMF 701 has enough information (e.g. RTT's and AOA's for the some/most/all of the UE's) it can use the same to jointly estimate the position of all UEs based on the determined absolute position (network/gNB based measurements) of each UE and the various sets of relative positions (sidelink UE measurements) of the UEs.

Examples of the disclosure may enable accurate positioning using a 5 MHz NR-LITE based solution by jointly using proximity devices for sidelink relative positioning along with course network based absolute positioning, wherein both such position procedures are constrained to using signalling and reference signals within NR-LITE bandwidths, e.g. <5 or <20 MHz.

The additional sidelink position procedures enable a refinement and augmentation/improved accuracy of network-based course positioning (i.e. using signalling limited to NR-LITE bandwidths) thereby providing an increase in positioning accuracy of a UE and its proximal UEs. Examples of the disclosure may thereby provide improved UE efficiency (reduced power consumption, reduced complexity and reduced costs) for asset tracking (e.g. wherein assets/items may be associated with UEs having NR-LITE connectivity with the network). Examples may also help ensure good tracking area coverage.

FIG. 9 is a signaling diagram showing a further example of the signaling 900 involved between the network entities of FIG. 7. The signalling 900 is broadly similar to the signalling 800 of FIG. 8, except that a differing position reference signal is sued for the sidelink position procedure.

In the signalling 800 of FIG. 8, the proximal devices (UE2 and UE3) are configured by the master device (UE1) to receive, decode, measure and respond to the SRS signal that is transmitted by the master device, via the Uu interface, as a part of the network-based positioning procedure to determine the position of the master device. By contrast, in the signalling 900 of FIG. 9, the proximal devices (UE2 and UE3) are configured by the master UE (UE1) to receive, decode, measure and respond to a different position signal; namely one that is instead transmitted by the master device via the PC5 interface. This positioning reference signal may be similar in characteristics, purpose and use as the SRS transmitted via the Uu interface for determining the position of the master device, albeit it is transmitted via the PC5 interface for determining the positions of the proximal devices relative to the master device.

Whilst the master device still transmits SRS via Uu, this is just decoded, measured and used by the gNB's in the procedure for determining the position of the master device, and the SRS is simultaneously decoded, measured and used by the proximal devices in the procedure for determining the positions of the proximity devices relative to the master device.

In the signaling of FIG. 9, the LMF invokes both network-based positioning and sidelink based positioning by configuring, via the serving gNB, UE1 to perform the same, using NR-LITE, by causing the sending of a "Positioning request (ink sidelink)" message. This thereby enables UE1 to act as a master positioning device (referred to herein as master device).

Responsive to receipt of the sidelink configurations, the sidelink positioning procedure 803', is carried out. The UE1 initially performs a sidelink discovery procedure to identify nearby devices with sidelink capabilities. In this regard, the master device scans for proximity devices with sidelink capabilities, i.e. UE2 and UE3.

Furthermore, responsive to the LMF's configuration message, the master device performs the network-based positioning, e.g. UL TDOA procedure. In this regard, the master device transmits an SRS signal to the serving and neighbouring gNBs. The SRS is decoded and measured by the gNBs and the UL-TDOA information can be estimated therefrom and passed on to the LMF.

The master device configures the discovered proximity devices to measure a positioning reference signal (e.g. a "Sidelink beacon (forward)" to be transmitted/broadcast by the master device via PC5 interface and request RTT measurements from the proximity device. In this regard, the master device may transmit, via the PC5 interface, a "Initiate RTT sidelink measurements" message.

The master device then transmits its positioning reference signal via the PC5 interface, i.e. the "Sidelink beacon (forward)" transmission. This positioning reference signal may have similar properties to the SRS transmitted over the Uu interface of FIG. 8, albeit in FIG. 9 it is transmitted over the PC5 interface.

Each proximity device receives, decodes and measures the "Sidelink beacon (forward)" received from the master device and responds to the same with its own transmission of a positioning reference signal via the PC5 interface, namely a "Sidelink beacon (reverse)".

Each proximity device may further respond to the received "Sidelink beacon (forward)" with information indicative of an amount of time (a "delta time") between receiving the "Sidelink beacon (forward)" and transmitting its "Sidelink beacon (reverse)". Such information may be provided in a "RTT ack)" message sent to the master device.

The process continues in a similar fashion to that of FIG. 8, with the calculation of RTT and AOA's of the proximity devices and sending such information (804) indicative of the positions of the proximity devices relative to the master device to the LMF, along with identifiers for each of the proximity devices, as well as the LMF selecting new master devices and repeating the positioning procedure 802' (including the network based positioning and the sidelink positioning 803') for each of the new master devices, i.e. sequentially performing positioning procedures 802a' and 802b' (each respectively including sidelink positioning procedures 803a' 803b' for determining information 804a, 804b indicative of the relative positions of the proximal devices to respective master devices, i.e. RTT and AOA for each master device) using the differing master devices.

Once the LMF has enough information (i.e. RTT and AOA's measurements from sufficient UE's), it can jointly estimate the position of all devices based on the various absolute positions (from the network-based positioning procedures) and relative positions (from the sidelink positioning and UE measurements of sidelink signals exchanged between the proximal devices). The additional sidelink position procedures thereby enable a refinement and augmentation/improved accuracy of network-based course positioning (i.e. using signalling limited to NR-LITE bandwidths), which provides an increase in positioning accuracy of a UE and its proximal UEs. Examples of the disclosure may provide improved UE efficiency (reduced power consumption, reduced complexity and reduced costs) for asset tracking.

Examples of the disclosure may be used with position/location tags, such as hyper tags. Hyper tags provide ubiquitous localization of assets without requiring massive scale ecosystem deployment. In an outdoor environment, hyper tags can be localized through the public cellular network, providing global coverage and 10-20 meter accuracy with no dedicated equipment. Once in an indoor environment, these tags can be located using densely deployed infrastructure locators and flexible Perception Gateways offering accuracy down to 1-2 meters. Furthermore, the tags may provide an IR beacon feature that allows infrastructure camera-based algorithms to enhance localization. In order to allow tracking of handling and storage conditions, hyper tags may maintain: 1) motion vector, 2) ambience vector and 3) co-presence vector using onboard: accelerometer, temperature and humidity sensors. These vectors may be offloaded periodically to the Perception Gateways in an energy-efficient way.

Such tags, incorporating a UE as per examples of the disclosure, may provide trackable device for asset tracking for use in diverse scenarios ranging from remote rural areas, urban outdoor areas, and indoor areas (incl. homes, offices, and larger factories).

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not.

Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determining" (and grammatical variants thereof) can include, not least: calculating, computing, processing, deriving, investigating, looking up (e.g., looking up in a table, a database or another data structure), ascertaining, measuring and the like. Also, "determining" can include receiving (e.g., receiving information), accessing (e.g., accessing data in a memory), obtaining and the like. Also, "determining" can include resolving, selecting, choosing, establishing, and the like.

References to a parameter (e.g. not least RTT and AOA) can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

What is claimed is:

1. A User Equipment (UE) comprising:
   at least one processor; and
   at least one memory including instructions,
   the at least one memory and the instructions configured to, with the at least one processor, cause the UE at least to perform:
      receiving, from a Radio Access Network (RAN) node, positioning configuration information for configuring the UE to perform a device-to-device communication channel based positioning procedure with one or more other UEs for enabling the UE to determine information indicative of one or more positions of the one or more other UEs relative to the UE;
      performing, based at least in part on the positioning configuration information, the device-to-device communication channel based positioning procedure and determining therefrom information indicative of the one or more positions of the one or more other UEs relative to the UE;
      transmitting, to the RAN node, the information indicative of the one or more positions of the one or more other UEs relative to the UE;

responsive to a selection, by a location server, of the UE as a selected UE from among the one or more other UEs, receiving, from the RAN node, second positioning configuration information that configures the selected UE to perform a further device-to-device communication channel based positioning procedure with at least one other UE for enabling the selected UE to determine information indicative of positions of the at least one other UE relative to the selected UE;

performing, based at least in part on the second positioning configuration information, the further device-to-device communication channel based positioning procedure and determining therefrom information indicative of the positions of the at least one other UE relative to the selected UE; and transmitting, to the RAN node for forwarding to the location server, the information indicative of the positions of the at least one other UE relative to the selected UE.

2. A Radio Access Network (RAN) node, comprising:
at least one processor; and
at least one memory including instructions, the at least one memory and the instructions configured to, with the at least one processor, cause the RAN node at least to perform:

transmitting, to a first User Equipment (UE), first positioning configuration information for configuring the first UE to perform a device-to-device communication channel based positioning procedure with one or more other UEs for enabling the first UE to determine first information indicative of one or more positions of the one or more other UEs relative to the first UE;

receiving, from the first UE, the first information indicative of the one or more positions of the one or more other UEs relative to the first UE;

transmitting, to a location server, the first information indicative of the one or more positions of the one or more other UEs relative to the first UE;

responsive to the transmission of the first information indicative of positions of one or more other UEs relative to the first UE, receiving, from the location server, a selection of a second UE from the one or more other UEs;

transmitting, to the second UE, second positioning configuration information for configuring the second UE to perform a second device-to-device communication channel based positioning procedure with the first UE and remaining one or more other UEs for enabling the second UE to determine second information indicative of positions of the first UE and the remaining one or more other UEs relative to the second UE;

receiving, from the second UE, the second information indicative of positions of the first UE and the remaining one or more other UEs relative to the second UE; and transmitting, to the location server, the second information indicative of the positions of the remaining one or more other UEs relative to the second UE.

3. The RAN node of claim 2, wherein the at least one memory and the instructions are further configured to, with the at least one processor, cause the RAN node at least to perform:

transmitting, to the first UE, third positioning configuration information for configuring the first UE to perform a RAN-to-device communication channel based positioning procedure for enabling a determination of information indicative of a position of the first UE;

receiving, from the first UE responsive to the third configuration information, a first reference signal; and reporting, to the location server, receipt of the first reference signal.

4. The RAN node of claim 2, wherein the at least one memory and the instructions are further configured to, with the at least one processor, cause the RAN node at least to perform:

transmitting, to each of the one or more other UEs, third positioning configuration information for configuring each of the one or more other UEs to perform a device-to-device communication channel based positioning procedure with each of the one or more other UEs and the respective remaining one or more other UEs, for enabling each of the one or more other UEs to determine information indicative of positions of each of the one or more other UEs and the respective remaining one or more other UEs relative to each of the one or more other UEs;

receiving, from each of the one or more other UEs, information indicative of the positions of the respective remaining one or more other UEs relative to each of the one or more other UEs; and transmitting, to the location server, the received information indicative of the positions of the respective remaining one or more other UEs relative to each of the one or more other UEs.

* * * * *